US012579840B2

(12) United States Patent
Ando et al.

(10) Patent No.: US 12,579,840 B2
(45) Date of Patent: Mar. 17, 2026

(54) BEHAVIOR ESTIMATION DEVICE, BEHAVIOR ESTIMATION METHOD, AND RECORDING MEDIUM

(71) Applicant: NEC Corporation, Tokyo (JP)

(72) Inventors: Ryuhei Ando, Tokyo (JP); Yasunori Babazaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 320 days.

(21) Appl. No.: 18/205,005

(22) Filed: Jun. 2, 2023

(65) Prior Publication Data
US 2023/0401894 A1 Dec. 14, 2023

(30) Foreign Application Priority Data
Jun. 9, 2022 (JP) ................................. 2022-093414

(51) Int. Cl.
| | |
|---|---|
| *G06K 9/00* | (2022.01) |
| *G06V 10/80* | (2022.01) |
| *G06V 20/40* | (2022.01) |
| *G06V 40/20* | (2022.01) |
| *G06V 10/82* | (2022.01) |

(52) U.S. Cl.
CPC ............ *G06V 40/20* (2022.01); *G06V 10/806* (2022.01); *G06V 20/46* (2022.01); *G06V 10/82* (2022.01)

(58) Field of Classification Search
None
See application file for complete search history.

(56) References Cited

U.S. PATENT DOCUMENTS

| | | | | |
|---|---|---|---|---|
| 9,355,368 | B2 * | 5/2016 | Djugash | B25J 19/026 |
| 10,475,185 | B1 * | 11/2019 | Raghavan | G06Q 10/087 |
| 11,172,189 | B1 * | 11/2021 | Elmieh | G06V 20/20 |
| 11,567,572 | B1 * | 1/2023 | Pratt | G06F 3/011 |
| 11,735,017 | B2 * | 8/2023 | Albero | G06F 18/23 |
| | | | | 348/143 |
| 11,954,990 | B2 * | 4/2024 | Albero | G08B 29/186 |

(Continued)

FOREIGN PATENT DOCUMENTS

| | | | | |
|---|---|---|---|---|
| CN | 110334607 A | * | 10/2019 | G06F 18/241 |
| CN | 111414797 A | * | 7/2020 | G06N 3/045 |

(Continued)

OTHER PUBLICATIONS

CN-110334607-A (machine translation) (Year: 2019).*

(Continued)

*Primary Examiner* — Feng Niu
(74) *Attorney, Agent, or Firm* — Sughrue Mion, PLLC

(57) ABSTRACT
In the behavior estimation device, a person feature extraction means extracts a feature of a person detected from a plurality of images in a time series. An object feature extraction means extracts a feature of an object detected from the plurality of images. A peripheral feature extraction means extracts a feature of a periphery of the person in the plurality of images. A feature aggregation means executes aggregation processing for aggregating the feature of the person, the feature of the object, and the feature of the periphery of the person. A behavior estimation processing means executes estimation processing for estimating the person's behavior included in the plurality of images based on information including a processing result of the aggregation processing.

4 Claims, 11 Drawing Sheets

(56) References Cited

U.S. PATENT DOCUMENTS

| | | | | |
|---|---|---|---|---|
| 2014/0279733 A1* | 9/2014 | Djugash | ................. | B25J 19/023 |
| | | | | 901/46 |
| 2015/0294193 A1 | 10/2015 | Tate et al. | | |
| 2015/0302310 A1* | 10/2015 | Wernevi | ................. | G16H 50/20 |
| | | | | 706/12 |
| 2017/0015318 A1* | 1/2017 | Scofield | ............... | H04M 15/60 |
| 2018/0178808 A1* | 6/2018 | Zhao | ........................ | B60N 2/20 |
| 2019/0012603 A1* | 1/2019 | Miller | ...................... | G06N 5/04 |
| 2019/0163982 A1 | 5/2019 | Block | | |
| 2020/0222949 A1* | 7/2020 | Murad | ...................... | B07C 7/02 |
| 2021/0064127 A1* | 3/2021 | Park | ...................... | G06F 18/253 |
| 2021/0248885 A1 | 8/2021 | Huang et al. | | |
| 2022/0405501 A1* | 12/2022 | Chowdhury | ........... | G06V 40/10 |
| 2022/0415138 A1* | 12/2022 | Albero | ................... | G07F 19/207 |
| 2022/0415146 A1* | 12/2022 | Albero | .............. | G08B 13/1609 |
| 2022/0415149 A1* | 12/2022 | Albero | ................. | G08B 29/186 |
| 2023/0252814 A1* | 8/2023 | Kim | ........................ | G06V 10/40 |
| | | | | 382/103 |
| 2023/0386305 A1* | 11/2023 | Albero | ...................... | G06N 5/01 |

FOREIGN PATENT DOCUMENTS

| | | | | | |
|---|---|---|---|---|---|
| CN | 112149616 | A | * 12/2020 | ............. | G06N 3/045 |
| CN | 112784765 | A | * 5/2021 | ........... | G06F 18/253 |
| CN | 114445741 | A | 5/2022 | | |
| JP | 2015-204030 | A | 11/2015 | | |
| JP | 2022-073882 | A | 5/2022 | | |
| JP | 2022-083232 | A | 6/2022 | | |
| WO | 2018/163555 | A1 | 9/2018 | | |

OTHER PUBLICATIONS

CN-111414797-A (machine translation) (Year: 2020).*

CN-112149616-A (machine translation) (Year: 2020).*

CN-112784765-A (machine translation) (Year: 2021).*

Chen et al., "An Efficient Recommendation Filter Model on Smart Home Big Data Analytics for Enhanced Living Environments." Sensors (Basel). Oct. 15, 2016;16(10):1706. doi: 10.3390/s16101706. PMID: 27754456; PMCID: PMC5087494. (Year: 2016).*

Liu et al., "Human Object Interaction Detection using Two-Direction Spatial Enhancement and Exclusive Object Prior." arXiv preprint arXiv:2105.03089 (2021). (Year: 2021).*

JP Office Action for JP Application No. 2022-093414, mailed on Jan. 27, 2026 with English Translation.

Nazli Ikizler-Cinbis et al., "Object, Scene and Actions: Combining Multiple Features for Human Action Recognition", Lecture Notes in Computer Science, Springer, 2010, pp. 494-07, DOI: 10.1007/978-3-642-15549-9_36, Retrieved from the Internet on Jan. 20, 2026, < https:/link.springer.com/chapter/10.1007/978-3-642-1549-9_36>.

Kobayashi et al., "Recognition of Detailed Actions in Working Images of Production Lines", SSII2019 [USB], Symposium on Sending via Image Information, Jun. 12, 2019, published by the Image Sensing Technology Workshop, Japan.

Do, Hang Nga et al., "Mining Specific actions from Youtube video with spatio-temporal features", IEICE Technical Report, PRMU, vol. 110, No. 414, pp. 159-164, Report No. PRMU2010-233, Feb. 10, 2011, The Institute of Electronics, Information and Communication Engineers, Japan.

* cited by examiner

VIDEO ——— BEHAVIOR ESTIMATION DEVICE ——— ESTIMATION RESULT

FIG. 9 y PIECES

Figure 9:
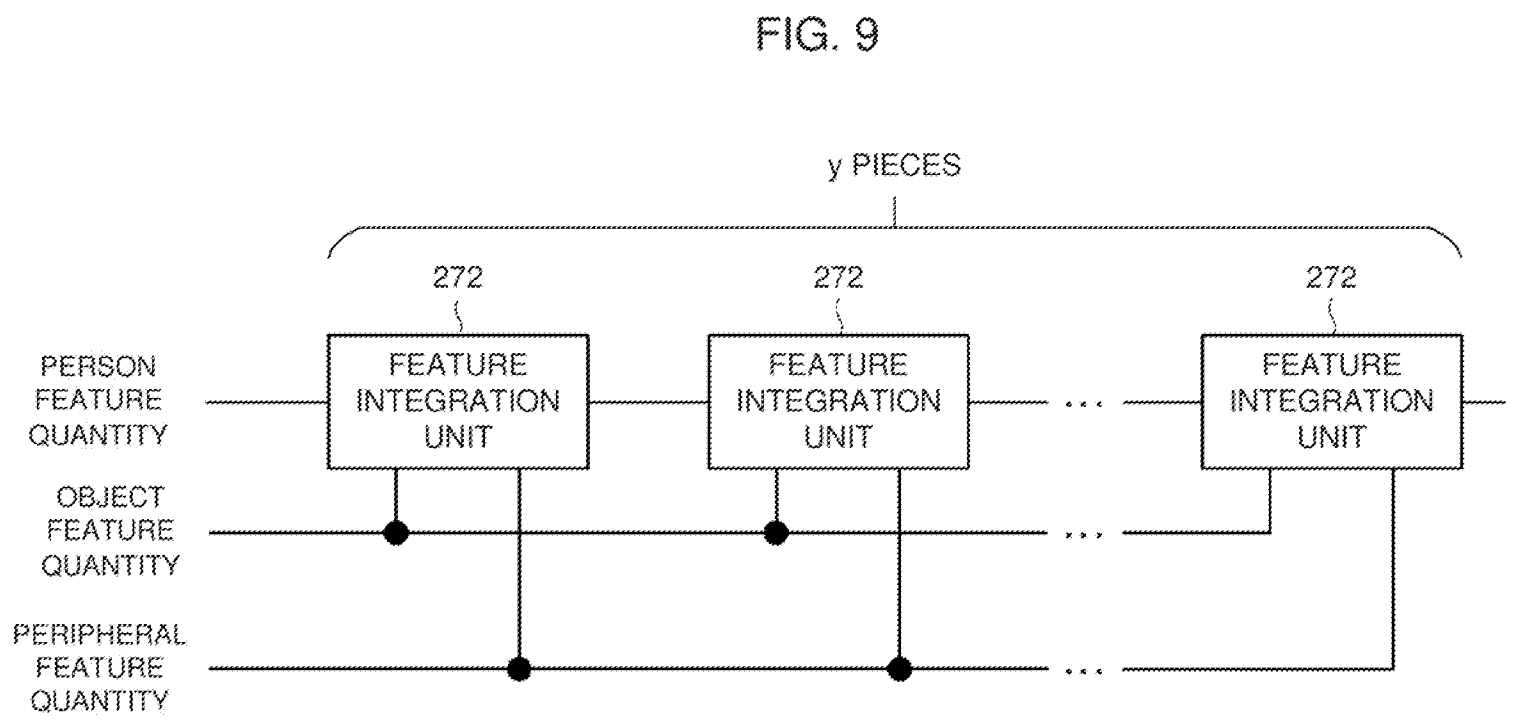

272 FEATURE INTEGRATION UNIT

272 FEATURE INTEGRATION UNIT

272 FEATURE INTEGRATION UNIT

PERSON FEATURE QUANTITY

OBJECT FEATURE QUANTITY

PERIPHERAL FEATURE QUANTITY

BEHAVIOR ESTIMATION DEVICE, BEHAVIOR ESTIMATION METHOD, AND RECORDING MEDIUM

TECHNICAL FIELD

The present disclosure relates to techniques available for human behavior estimation.

BACKGROUND ART

Techniques for estimating the behavior of a person in an image are known in the art.

Specifically, for example, Patent Document 1 discloses a technique for extracting a posture feature of a person who is projected in an image generated by the imaging device, extracting a peripheral feature indicating a shape, a position, or a type of a peripheral object of the person who is reflected in the image, filtering the peripheral feature based on the posture feature and the degree of importance of the peripheral feature set in association with the posture feature, and estimating a behavior class of the person who is reflected in the image based on the posture feature and the filtered peripheral feature.

PRECEDING TECHNICAL REFERENCES

Patent Document

Patent Document 1: International Publication WO2018/163555

SUMMARY

Problem to be Solved by the Invention

However, according to the technique disclosed in Patent Document 1, for example, since it does not consider the relevance between the person in the image and the peripheral object of the person, there is a problem that it may not be possible to correctly estimate the behavior of the person. Further, according to the technique disclosed in Patent Document 1, for example, when the object around the person could not be detected, there is a problem that the behavior of the person cannot be correctly estimated.

That is, according to the technique disclosed in Patent Document 1, there occurs such a problem that the estimation accuracy at the time of estimating the behavior of the person is reduced.

One object of the present disclosure is to provide a behavior estimation device capable of improving estimation accuracy in estimating a person's behavior.

Means for Solving the Problem

According to one aspect of the present disclosure, there is provided a behavior estimation device comprising:

a person feature extraction means configured to extract a feature of a person detected from a plurality of images in a time series;

an object feature extraction means configured to extract a feature of an object detected from the plurality of images;

a peripheral feature extraction means configured to extract a feature of a periphery of the person in the plurality of images;

a feature aggregation means configured to execute aggregation processing for aggregating the feature of the person, the feature of the object, and the feature of the periphery of the person; and a behavior estimation processing means configured to execute estimation processing for estimating the person's behavior included in the plurality of images based on information including a processing result of the aggregation processing.

According to another aspect of the present disclosure, there is provided a behavior estimation device comprising:

a person feature extraction means configured to extract a feature of a person detected from a plurality of images in a time series;

an object feature extraction means configured to extract a feature of an object detected from the plurality of images;

a peripheral feature extraction means configured to extract a feature of a periphery of the person in the plurality of images;

a feature integration means configured to execute integration processing for integrating the feature of the person, the feature of the object, and the feature of the periphery of the person;

an aggregation processing means configured to execute aggregation processing for aggregating the feature of the person and a processing result of the integration processing; and a behavior estimation processing means configured to estimate the person's behavior included in the plurality of images based on information including a processing result of the aggregation processing.

According to still another aspect of the present disclosure, there is provided a behavior estimation method comprising:

extracting a feature of a person detected from a plurality of images in a time series;

extracting a feature of an object detected from the plurality of images;

extracting a feature of a periphery of the person in the plurality of images;

executing aggregation processing for aggregating the feature of the person, the feature of the object, and the feature of the periphery of the person; and executing estimation processing for estimating the person's behavior included in the plurality of images based on information including a processing result of the aggregation processing.

According to still another aspect of the present disclosure, there is provided a behavior estimation method comprising:

extracting a feature of a person detected from a plurality of images in a time series;

extracting a feature of an object detected from the plurality of images;

extracting a feature of a periphery of the person in the plurality of images;

executing integration processing for integrating the feature of the person, the feature of the object, and the feature of a periphery of the person;

executing aggregation processing for aggregating the feature of the person and a processing result of the integration processing; and estimating the person's behavior included in the plurality of images based on information including a processing result of the aggregation processing.

According to still another aspect of the present disclosure, there is provided a recording medium for recording a program, the program causing a computer to execute:

extracting a feature of a person detected from a plurality of images in a time series;

extracting a feature of an object detected from the plurality of images;

extracting a feature of a periphery of the person in the plurality of images;

executing aggregation processing for aggregating the feature of the person, the feature of the object, and the feature of the periphery of the person; and executing estimation processing for estimating the person's behavior included in the plurality of images based on information including a processing result of the aggregation processing.

According to still another aspect of the present disclosure, there is provided a recording medium for recording a program, the program causing a computer to execute:

extracting a feature of a person detected from a plurality of images in a time series;

extracting a feature of an object detected from the plurality of images;

extracting a feature of a periphery of the person in the plurality of images;

executing aggregation processing for aggregating the feature of the person, the feature of the object, and the feature of the periphery of the person; and estimating the person's behavior included in the plurality of images based on information including a processing result of the aggregation processing.

Effect of the Invention

According to the present disclosure, it is possible to improve the estimation accuracy in estimating the behavior of a person.

BRIEF DESCRIPTION OF THE DRAWINGS

FIG. 1 is a diagram illustrating an outline of a behavior estimation device according to a first example embodiment.

FIG. 9 is a diagram illustrating an example of a configuration in which plural feature integration units are provided in the feature aggregation unit of FIG. 8.

EXAMPLE EMBODIMENTS

Hereinafter, preferred example embodiments of this disclosure will be described with reference to the drawings.

First Example Embodiment

[Schematic Configuration]

Figure 1:
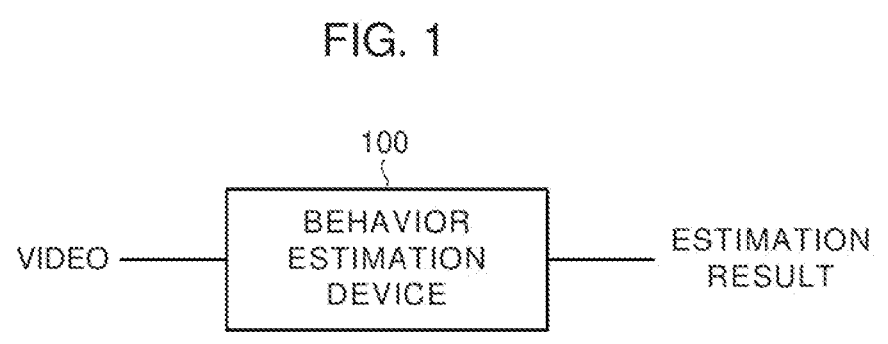

FIG. 1 is a diagram illustrating an outline of a behavior estimation device according to a first example embodiment. The behavior estimation device 100 is constituted by a device such as a personal computer, for example. The behavior estimation device 100 executes behavior estimation processing for estimating the behavior of the person included in the video captured by the camera or the like. In addition, the behavior estimation device 100 outputs the estimation result obtained by the above-described behavior estimation processing to the external device.

[Hardware Configuration]

Figure 2:
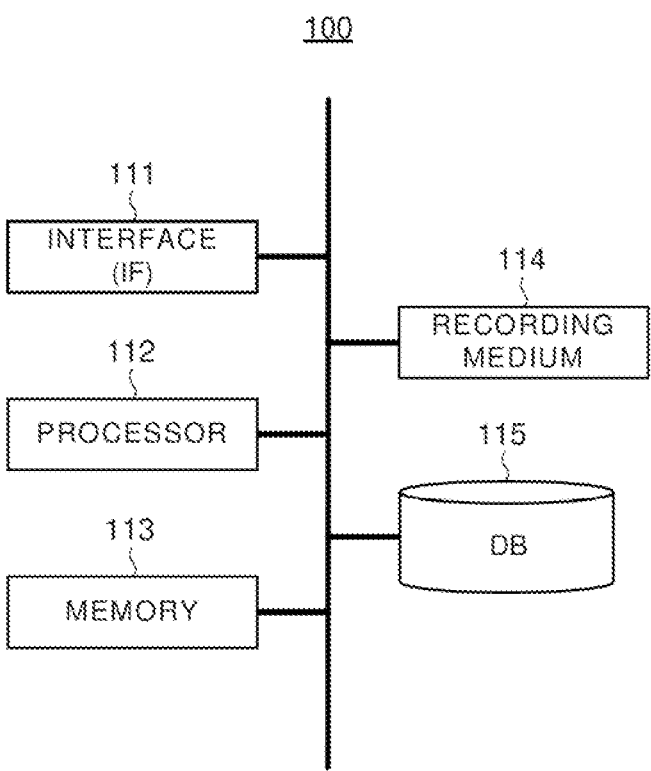
FIG. 2 is a block diagram illustrating a hardware configuration of the behavior estimation device according to the first example embodiment.

FIG. 2 is a block diagram illustrating a hardware configuration of the behavior estimation device according to the first example embodiment. The behavior estimation device 100 includes an interface (IF) 111, a processor 112, a memory 113, a recording medium 114, and a data base (DB) 115 as shown in FIG. 2.

The IF 111 inputs and outputs data to and from external devices. The video captured by the camera or the like is inputted to the behavior estimation device 100 through the IF 111. The estimation result obtained by the behavior estimation device 100 is outputted to the external device through the IF 111 as required.

The processor 112 is a computer, such as a CPU (Central Processing Unit), that controls the entire behavior estimation device 100 by executing a program prepared in advance. Specifically, the processor 112 executes processing such as the behavior estimation processing.

The memory 113 may be configured by a ROM (Read Only Memory), a RAM (Random Access Memory), and the like. The Memory 113 is also used as a working memory during various processing operations by the processor 112.

The recording medium 114 is a non-volatile and non-transitory recording medium such as a disk-like recording medium, a semiconductor memory, or the like, and is configured to be detachable from the behavior estimation device 100. The recording medium 114 records various programs executed by the processor 112. When the behavior estimation device 100 executes various processing, the program recorded in the recording medium 114 is loaded into the memory 113 and executed by the processor 112.

The DB 115 stores, for example, information inputted through the IF 111 and the processing results obtained by the processing of the processor 112.

[Function Configuration]

Figure 3:
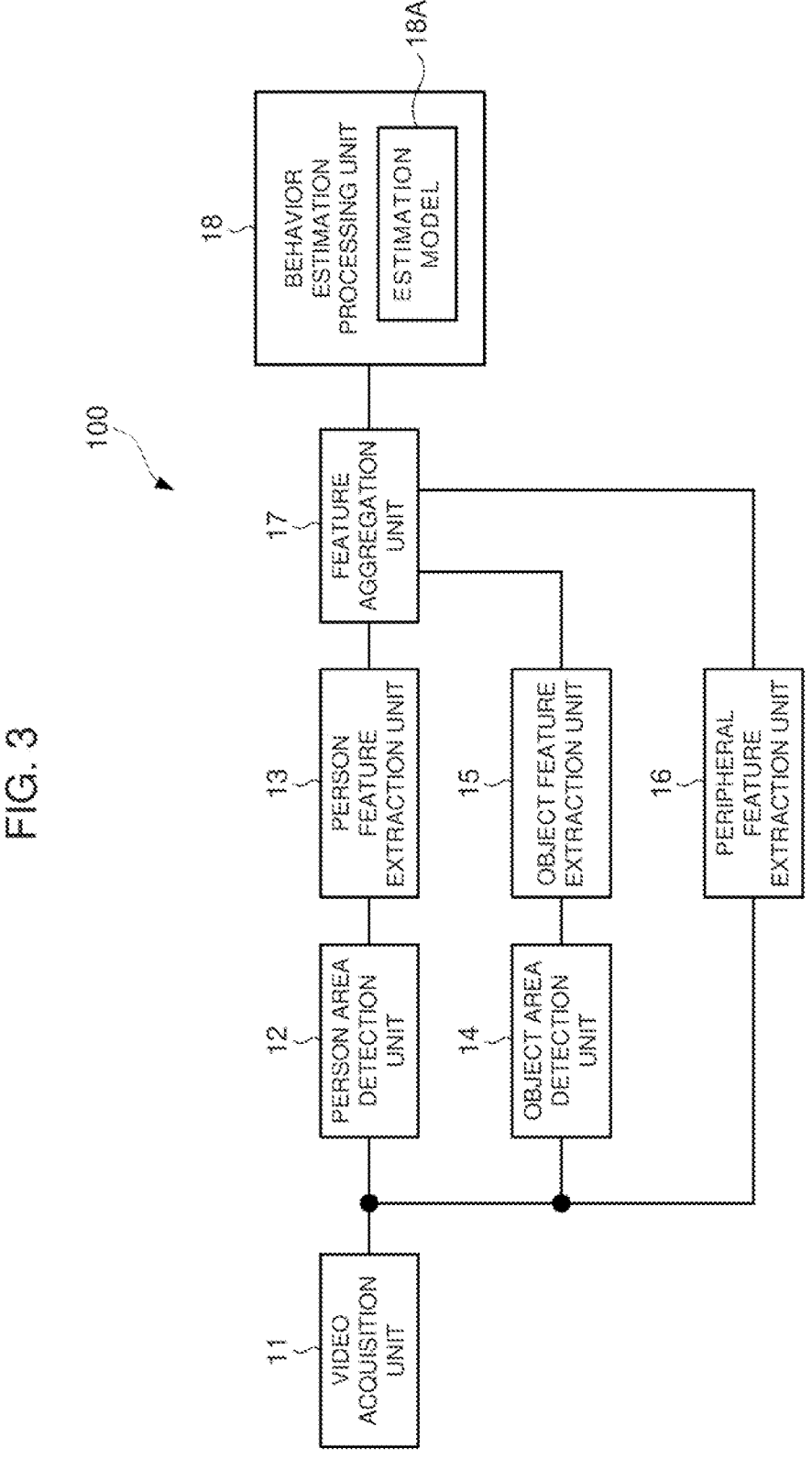
FIG. 3 is a block diagram illustrating a functional configuration of the behavior estimation device according to the first example embodiment.

FIG. 3 is a block diagram illustrating a functional configuration of a behavior estimation device according to the first example embodiment. As shown in FIG. 3, the behavior estimation device 100 includes a video acquisition unit 11, a person area detection unit 12, a person feature extraction unit 13, an object area detection unit 14, an object feature extraction unit 15, a peripheral feature extraction unit 16, a feature aggregation unit 17, and a behavior estimation processing unit 18.

The video acquisition unit 11 acquires a video captured by the camera or the like and outputs the acquired video to the person area detection unit 12, the object area detection unit 14, and the peripheral feature extraction unit 16.

In the following description, unless otherwise specified, it is assumed that one or more persons and one or more objects are included in the video acquired by the video acquisition unit 11.

The person area detection unit 12 executes processing for detecting a person in each of a plurality of time-series images included in the video obtained by the video acquisition unit 11. In addition, the person area detection unit 12 generates the person detection information which is the information that can identify the area in the image corresponding to the person detected by the above-described processing as the person area, and outputs the generated person detection information to the person feature extraction unit 13. The person area may be, for example, a rectangular area that individually surrounds the periphery of one or more persons in the image.

The person feature extraction unit 13 is configured to execute processing using a neural network (hereinafter, abbreviated as NN), such as a CNN (Convolutional Neural Network), for example. In addition, the person feature extraction unit 13 identifies the person area in the image based on the person detection information obtained by the person area detection unit 12 and executes processing for extracting the features of the person included in the identified person area. Specifically, the person feature extraction unit 13 executes the processing for extracting the person feature quantity that is a feature quantity satisfying a predetermined condition among the plurality of feature quantities calculated based on the pixel values of each pixel included in the person area, as the feature of the person included in the person area. In addition, when the person detection information includes a plurality of person areas, the person feature extraction unit 13 executes the above-described processing for each of the plurality of person areas. Then, the person feature extraction unit 13 generates the person feature information that is the information related to the calculated person feature quantity in the person area in the image, and outputs the generated person feature information to the feature aggregation unit 17.

The object area detection unit 14 executes processing for detecting a predetermined object other than a person in each of a plurality of time-series images included in the video obtained by the video acquisition unit 11. In addition, the object area detection unit 14 generates object detection information which is information capable of identifying an area in the image corresponding to the predetermined object detected by the above-described processing as an object area, and outputs the generated object detection information to the object feature extraction unit 15. The object area may be, for example, a rectangular area that individually surrounds the periphery of one or more objects in the image. The object area detection unit 14 may execute processing for detecting an object such as a power shovel or a scoop as a predetermined object, for example, when a video captured in the construction site is obtained by the video acquisition unit 11.

The object feature extraction unit 15 is configured to execute processing using a NN such as a CNN, for example. The object feature extraction unit 15 also executes processing for identifying an object area in the image based on the object detection information obtained by the object area detection unit 14 and extracting a feature of an object included in the identified object area. Specifically, the object feature extraction unit 15 executes processing for extracting, for example, an object feature quantity that is a feature quantity satisfying a predetermined condition among a plurality of feature quantities calculated based on the pixel value of each pixel included in the object area, as a feature of an object included in the object area. In addition, when the object detection information includes a plurality of object areas, the object feature extraction unit 15 executes the above-described processing for each of the plurality of object areas. Then, the object feature extraction unit 15 generates the object feature information which is the information according to the object feature quantity calculated in the object area in the image, and outputs the generated object feature information to the feature aggregation unit 17.

Figure 4:
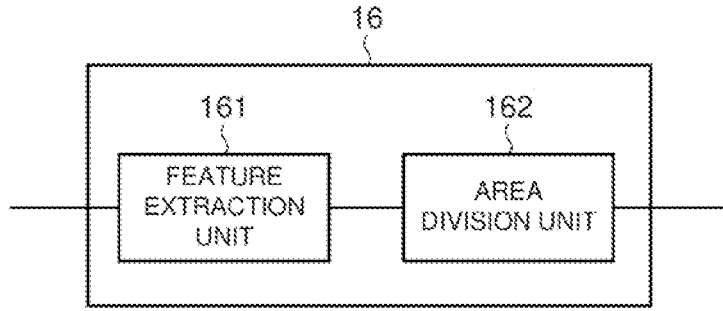
FIG. 4 is a diagram illustrating an example of a configuration of the peripheral feature extraction unit included in the behavior estimation device according to the first example embodiment.

The peripheral feature extraction unit 16 extracts the feature of each of the plurality of time-series images included in the video obtained by the video acquisition unit 11, and outputs information representing the extracted feature to the feature aggregation unit 17 as the peripheral feature information. For example, as shown in FIG. 4, the peripheral feature extraction unit 16 includes a feature extraction unit 161, and an area division unit 162. FIG. 4 is a diagram illustrating an example of a configuration of the peripheral feature extraction unit included in the behavior estimation device according to the first example embodiment.

The feature extraction unit 161 is configured to execute processing using a NN such as a CNN, for example. Further, the feature extraction unit 161 executes processing for extracting, from the entire image obtained by the video acquisition unit 11, a peripheral feature quantity which is a feature quantity satisfying a predetermined condition among a plurality of feature quantities calculated based on the pixel value, as a feature of the image. In other words, the feature extraction unit 161 extracts a feature of a person included in the image, a feature of an object included in the image, and a feature of a background portion other than the person and the object, as the features of the image included in the image outputted from the image acquisition unit 11. The above-described feature of the background portion may be referred to as a feature of the periphery of the person detected by the person area detection unit 12. The above-described feature of the background portion includes, for example, a feature of an object that exists at a position apart from the person detected by the person area detection unit 12 by a certain distance or more, and a feature of an object other than the predetermined objects that are detected by the object area detection unit 14.

The area division unit 162 executes processing for dividing an area corresponding to each of the plurality of features extracted by the feature extraction unit 161 as a rectangular area. The area division unit 162 generates peripheral feature information which is information related to the peripheral feature quantity calculated in each rectangular area divided by the above-described area division, and outputs the generated peripheral feature information to the feature aggregation unit 17.

The peripheral feature extraction unit 161 of the present example embodiment is not limited to the one in which the area division unit 162 is provided after the feature extraction unit 161, and may be one in which the feature extraction unit 161 is provided after the area division unit 162. In such a case, for example, the processing of dividing the entire image included in the video outputted from the video acquisition unit 11 into a plurality of rectangular areas is executed by the area division unit 162, and the processing of extracting the area representing the feature of the image from the plurality of rectangular areas and the processing of generating the peripheral feature information which is the information related to the peripheral feature quantity calculated in the extracted area may be executed by the feature extraction unit 161.

Figure 5:
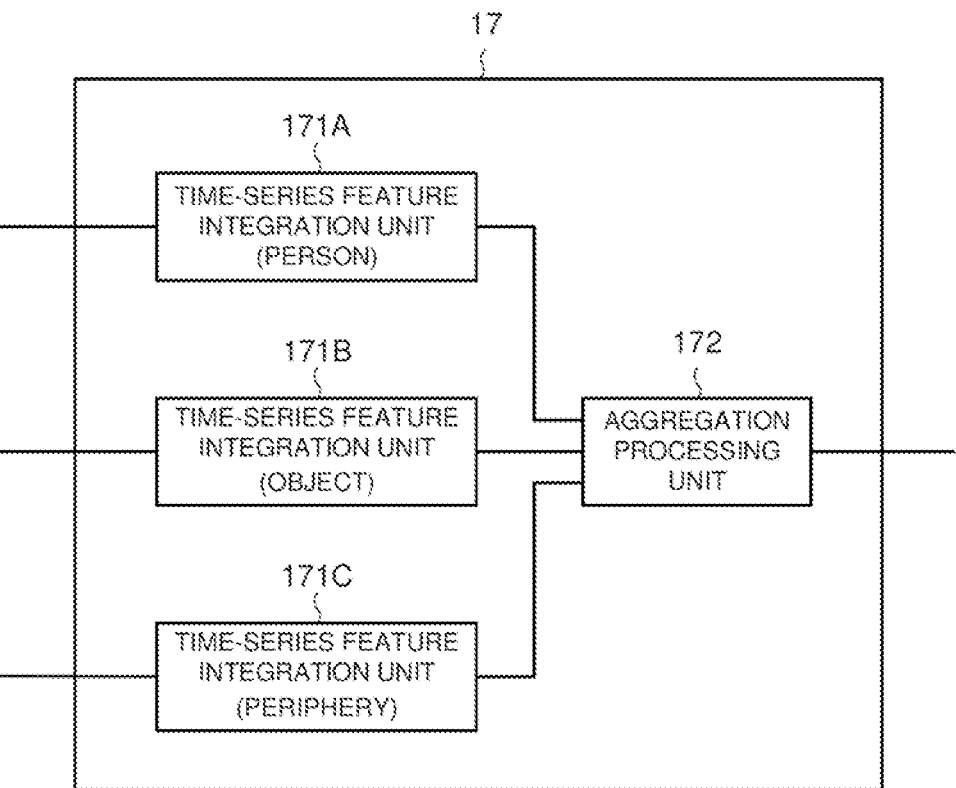
FIG. 5 is a diagram illustrating an example of a configuration of the feature aggregation unit included in the behavior estimation device according to the first example embodiment.

The feature aggregation unit 17 executes processing for aggregating a person feature quantity column corresponding to a plurality of person feature quantities included in the n (n≥2) person feature information acquired in a time series from the person feature extraction unit 13, an object feature quantity column corresponding to a plurality of object feature quantities included in the n object feature information acquired in a time series from the object feature extraction unit 15, and a peripheral feature quantity column corresponding to a plurality of peripheral feature quantities included in the n peripheral feature information acquired in a time series from the peripheral feature extraction unit 16. The feature aggregation unit 17 outputs the feature vector obtained according to the processing result of the above-described processing to the behavior estimation processing unit 18. The above-described feature vector can be paraphrased as information including the processing result of the aggregation processing executed by the feature aggregation unit 17. The feature aggregation unit 17 includes, for example, time-series feature integration units 171A, 171B and 171C, and an aggregation processing unit 172, as shown in FIG. 5. FIG. 5 is a diagram illustrating an example of a configuration of the feature aggregation unit included in the behavior estimation device according to the first example embodiment.

The time-series feature integration unit 171A executes processing for integrating the plurality of person feature quantities included in the person feature quantity column into one. Specifically, the time-series feature integration unit 171A integrates the plurality of person feature quantities into one person feature quantity by calculating an average of the plurality of person feature quantities included in the person feature quantity column, for example. Alternatively, the time-series feature integration unit 171A integrates the plurality of person feature quantities into one person feature quantity by executing weighted addition using the plurality of person feature quantities included in the person feature quantity column and a NN having a Source-Target Attention mechanism, for example. When the processing using the NN having a Source-Target Attention mechanism is executed in the time-series feature integration unit 171A, for example, the person feature quantity to be weighted is inputted to the query of the mechanism, and the same person feature quantity column is inputted to the key and the value of the mechanism. In addition, the time-series feature integration unit 171A executes processing for integrating the plurality of the person feature quantities into one for each person that can be identified based on the person feature information or the person feature quantity column. Therefore, when the number of the persons identifiable based on the person feature information or the person feature quantity column is k (k≥1), the time-series feature integration unit 171A acquires k integrated person feature quantities by executing the processing for integrating the plurality of person feature quantities into one.

The time-series feature integration unit 171B executes processing for integrating the plurality of object feature quantities included in the object feature quantity column into one. Specifically, the time-series feature integration unit 171B, for example, integrates the plurality of object feature quantities into one object feature quantity by calculating an average of the plurality of object feature quantities included in the object feature quantity column. Alternatively, the time-series feature integration unit 171B integrates the plurality of object feature quantities into one object feature quantity by executing weighted addition using the plurality of object feature quantities included in an object feature quantity column and a NN having a Source-Target Attention mechanism, for example. When the processing using the NN having the Source-Target Attention mechanism is executed in the time-series feature integration unit 171B, for example, the object feature quantity to be weighted is inputted to the query of the mechanism, and the same object feature quantity column is inputted to the key and the value of the mechanism. In addition, the time-series feature integration unit 171B executes processing for integrating the plurality of object feature quantities into one for each object that can be identified based on the object feature information or the object feature quantity column. Therefore, when the number of the objects identifiable based on the object feature information or the object feature quantity column is m (m≥1) objects, the time-series feature integration unit 171B acquires m integrated object feature quantities by executing the processing for integrating the plurality of object feature quantities into one.

The time-series feature integration unit 171C executes processing for integrating the plurality of peripheral feature quantities included in the peripheral feature quantity column into one. Specifically, the time-series feature integration unit 171C, for example, integrates the plurality of peripheral feature quantities into one peripheral feature quantity by calculating an average of the plurality of peripheral feature quantities included in the peripheral feature quantity column. Alternatively, the time-series feature integration unit 171C integrates the plurality of peripheral feature quantities into one peripheral feature quantity by executing weighted addition using the plurality of peripheral feature quantities included in the peripheral feature quantity column and a NN having a Source-Target Attention mechanism, for example. When the processing using the NN having the Source-Target Attention mechanism is executed in the time-series feature integration unit 171C, for example, the peripheral feature quantity of the weighted object is inputted to the query of the mechanism, and the same peripheral feature quantity column is inputted to the key and the value of the mechanism. In addition, the time-series feature integration unit 171C executes processing for integrating the plurality of peripheral feature quantities into one for each rectangular area that can be identified based on the peripheral feature information or the peripheral feature quantity column. Therefore, when the number of the rectangular area identifiable based on the peripheral feature information or the peripheral feature quantity column is p (p≥1), the time-series feature integration unit 171C acquires p integrated peripheral feature quantities by executing the processing for integrating the plurality of peripheral feature quantities into one.

The aggregation processing unit 172 executes processing for aggregating the k person feature quantities obtained by the time-series feature integration unit 171A, the m object feature quantities obtained by the time-series feature integration unit 171B, and the p peripheral feature quantities obtained by the time-series feature integration unit 171C.

Figure 6:
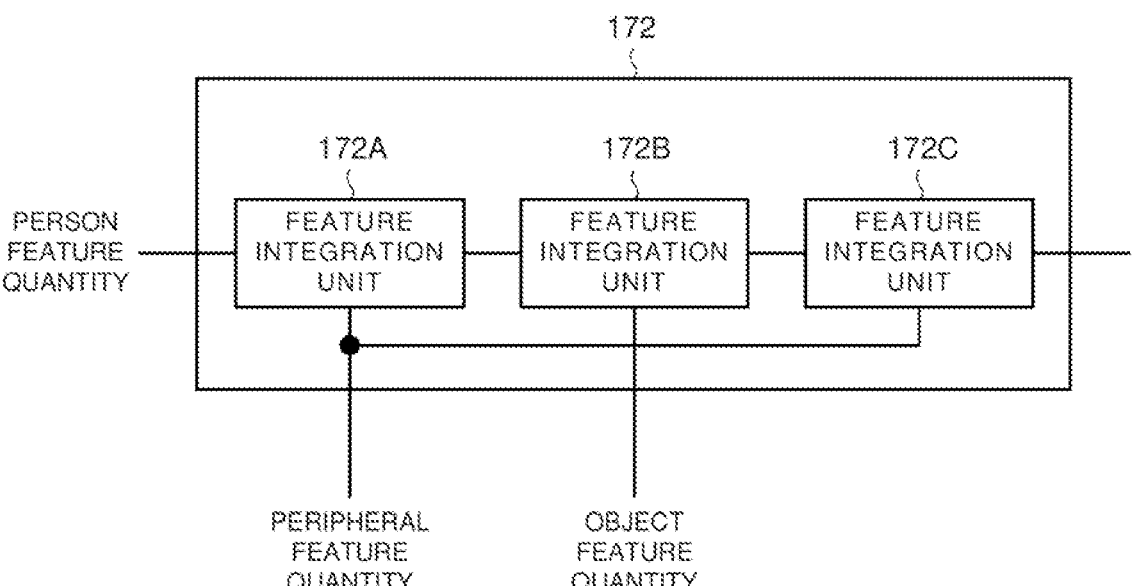
FIG. 6 is a diagram illustrating an example of a configuration of the aggregation processing unit included in the behavior estimation device according to the first example embodiment.

The aggregation processing unit 172 acquires the feature vector according to the processing result of the above-described processing, and outputs the acquired feature vector to the behavior estimation processing unit 18. According to the present example embodiment, as long as the feature vector generated according to the processing results of the above-described processing is outputted to the behavior estimation processing unit 18, a plurality of aggregation processing units 172 may be connected in series. Also, the aggregation processing unit 172 includes, for example, feature integration units 172A, 172B and 172C as shown in FIG. 6. FIG. 6 is a diagram illustrating an example of a configuration of the aggregation processing unit included in the behavior estimation device according to the first example embodiment.

The feature integration unit 172A acquires the first processing result by executing the first processing of integrating the feature of the periphery of the person with the feature of a person, and outputs the acquired first processing result to the feature integration unit 172B. The feature integration unit 172A has a NN that is learned in advance so that a scene feature quantity obtained by associating the peripheral feature quantity with the person feature quantity can be obtained by integrating the person feature quantity and the peripheral feature quantity. In addition, the feature integration unit 172A acquires the k scene feature quantities corresponding to the k person feature quantities by inputting the k person feature quantities and the p peripheral feature quantities to the NN having the Source-Target Attention mechanism to execute the weighted addition. Specifically, the feature integration unit 172A acquires the k scene feature quantities corresponding to the k person feature quantities by repeating the process of executing the weighted addition k times by inputting one person feature quantity to be weighted to the query of the Source-Target Attention mechanism and inputting the feature quantity column having the p peripheral feature quantities to the key and the value of the mechanism. That is, the scene feature quantity is acquired as a feature quantity representing a feature of a photographing scene (for example, a background or the like at the time of photographing) for each of the k people included in the image captured by a camera or the like.

The feature integration unit 172B acquires the second processing result by executing the second processing of integrating the feature of the object with the first processing result outputted from the feature integration unit 172A, and outputs the obtained second processing result to the feature integration unit 172C. The feature integration unit 172B has a NN that is learned in advance so that the situation feature quantity that is the feature quantity obtained by associating the object feature quantity with the scene feature quantity by integrating the scene feature quantity and the object feature quantity. In addition, the feature integration unit 172B acquires the k situation feature quantities corresponding to the k scene feature quantities by inputting the k scene feature quantities obtained by the feature integration unit 172A and the m object feature quantities into the NN having a Source-Target Attention mechanism to execute weighted addition. Specifically, the feature integration unit 172B acquires the k situation feature quantities corresponding to the k scene feature quantities by repeating the process of executing the weighted addition k times by inputting one scene feature quantity to be weighted to the query of the Source-Target Attention mechanism and inputting the feature quantity column having the m object feature quantities to the key and the value of the mechanism. That is, the situation feature quantity is acquired as a feature quantity representing a feature of a photographing situation (for example, a distance between a person and an object at the time of photographing or the like) for each of k persons included in the image captured by the camera or the like.

Also, the feature integration unit 172B acquires the relevance degree information that is the information indicating the relevance degree of the m objects to the behavior of the k persons captured by the camera or the like.

Specifically, the feature integration unit 172B acquires the entropy value of the weight obtained as the result of the processing of the Softmax layer in the Source-Target Attention mechanism, for example, as the relevance degree. Then, for example, when the entropy value described above is relatively large, it can be estimated that the relevance degree of the object to the person's behavior taken by the camera or the like is relatively high. Further, for example, when the above-described entropy value is relatively small, it can be estimated that the relevance degree of the object to the person's behavior taken by the camera or the like is relatively low.

On the other hand, the feature integration unit 172B may be learned such that, for example, when an object corresponding to the person's behavior does not exist in the image, the weight for the dummy feature quantity set as the feature quantity that simulates a desired one object becomes the largest. When such a learning is executed, the feature integration unit 172B can acquire, as the relevance degree information, the value of the weight set for the dummy feature quantity information when the weighted addition is executed by inputting the feature quantity column to which the dummy feature quantity (vector column) is added for the m object feature quantities to the key and the value of the Source-Target Attention mechanism. Then, for example, when the value of the weight set for the dummy feature quantity is relatively small, it can be estimated that the relevance degree of the object to the person's behavior captured by the camera or the like is relatively low. Further, for example, when the value of the weight set for the dummy feature quantity is relatively large, it can be estimated that the relevance degree of the object to the person's behavior captured by the camera or the like is relatively high. In the present example embodiment, instead of the learning using the dummy feature quantity, the learning using the teacher data including the labels indicating the relation between the person's behavior and the object may be executed in the feature integration unit 172B. Even when such a learning is executed, the feature integration unit 172B can acquire the relevance degree information similar to the value of the weight set for the dummy feature quantity.

The feature integration unit 172C acquires the third processing result by executing the third processing of integrating the feature of the periphery of the person with the second processing result outputted from the feature integration unit 172B, and outputs the information including the acquired third processing result to the behavior estimation processing unit 18. The feature integration unit 172C has a NN that is learned in advance so that the integrated feature quantity that is the feature quantity obtained by associating the peripheral feature quantity with the situation feature quantity by integrating the situation feature quantity and the peripheral feature quantity. In addition, the feature integration unit 172C acquires the k integrated feature quantities corresponding to the k situation feature quantities by inputting the k situation feature quantities and the relevance degree information obtained by the feature integration unit 172B and the p peripheral feature quantities into the NN having the Source-Target Attention mechanism to execute the weighted addition. Specifically, the feature integration unit 172C acquires the k integrated feature quantities corresponding to k situation feature quantities by repeating the process of executing the weighted addition k times by inputting one situation feature quantity to be weighted to the query of the Source-Target Attention mechanism and inputting the feature quantity column having the p peripheral feature quantities to the key and the value of the mechanism. In addition, the feature integration unit 172C sets the weights in the above-described weighted addition based on the relevance degree information. Specifically, the feature integration unit 172C, for example, sets a value obtained by dividing the value of the entropy specified from the relevance degree information by the largest value of the entropy, as the weight used in the weighted addition described above. Alternatively, for example, the feature integration unit 172C sets a value obtained by subtracting the value of the weight for the dummy feature quantity specified from the relevance degree information from "1" as a weight used in the weighted addition described above. The feature integration unit 172C acquires the feature vector according to the k integrated feature quantities, and outputs the acquired feature vector to the behavior estimation processing unit 18.

Here, according to the processing of the feature integration unit 172C as described above, for example, when an object having a high relevance degree to the person's behavior exists in the image, the weight used in the weighted addition is set to a relatively small value. Then, in such a case, the feature integration unit 172C acquires the feature vector including the relatively small integrated feature quantities.

Further, according to the processing of the feature integration unit 172C as described above, for example, when an object having a high relevance degree to the person's behavior does not exist in the image and when the object having a high relevance degree to the person's behavior cannot be detected, the weight used in the weighted addition is set to a relatively large value. Then, in such cases, the feature integration unit 172C acquires the feature vector including the relatively large integrated feature quantities.

That is, according to the above-described processing of the feature integration unit 172C, it is possible to acquire the feature vector having the integrated feature quantity that can be used for the behavior estimation of each of the k persons included in the video captured by the camera or the like.

The behavior estimation processing unit 18 executes behavior estimation processing for estimating the behavior of the person included in the video outputted from the video acquisition unit 11 based on the output information obtained by inputting the feature vector obtained by the feature aggregation unit 17 into the estimation model 18A. In addition, the behavior estimation processing unit 18 outputs the estimation result obtained by the above-described behavior estimation processing to an external device.

The estimation model 18A is configured as a model including a neural network such as CNN, for example. The estimation model 18A is configured, for example, as a learned model for which machine learning is executed by using teacher data in which the feature vector obtained from a plurality of images in a time series is associated with a behavior label representing the behavior of a person included in the plurality of images as one of predetermined plural behaviors. Therefore, the estimation model 18A can obtain, as the output information described above, a behavior score that is a value indicating the probability of each class when the feature vector obtained by the feature aggregation unit 17 is classified into one of the plurality of classes corresponding to the predetermined plural behaviors. In addition, when the estimation model 18A has the configuration as described above, the behavior estimation processing unit 18 may obtain one behavior corresponding to one class having the largest value among the plurality of values included in the above-described behavior scores as the estimation result of the behavior of the person included in the video outputted from the video acquisition unit 11.

In the present example embodiment, the NN parameters used in the processing of the person feature extraction unit 13, the object feature extraction unit 15, and/or the peripheral feature extraction unit 16 may be adjusted based on the parameters of the estimation model 18A when the estimated result is obtained by the behavior estimation processing unit 18. In the present example embodiment, the NN parameters used in the processing of the feature aggregation unit 17 may be adjusted based on the parameters of the estimation model 18A when the estimation result is obtained by the behavior estimation processing unit 18.

[Processing Flow]

Figure 7:
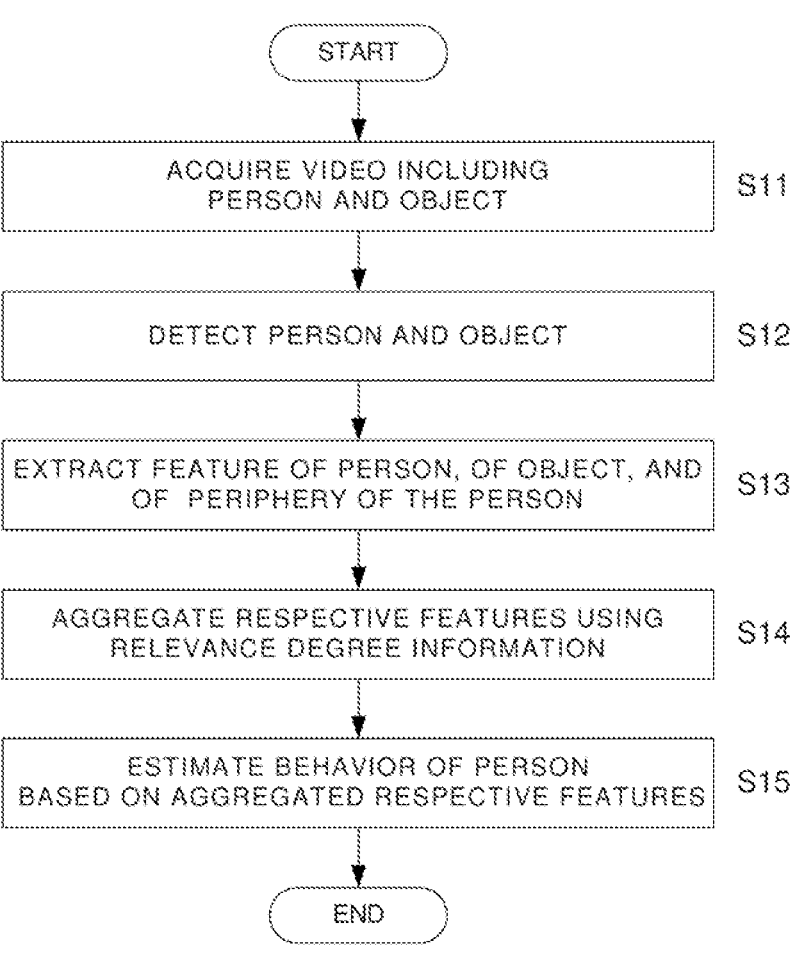
FIG. 7 is a flowchart illustrating processing executed by the behavior estimation device according to the first example embodiment.

Subsequently, a flow of processing executed by the behavior estimation device according to the first example embodiment will be described. FIG. 7 is a flowchart illustrating processing executed by the behavior estimation device according to the first example embodiment.

First, the behavior estimation device 100 acquires a video including one or more persons and one or more objects (step S11).

Next, the behavior estimation device 100 detects a person and an object from among a plurality of time-series images included in the video acquired in step S11 (step S12).

Subsequently, the behavior estimation device 100 extracts the features of the person and the object detected in step S12 (step S13). In addition, the behavior estimation device 100 extracts the feature of the periphery of the person detected by in step S12 (step S13).

Subsequently, the behavior estimation device 100 aggregates the respective features extracted in step S13 using the relevance degree information indicating the relevance degree of the objects detected in step S12 with respect to the person's behavior detected in step S12 (step S14).

Finally, the behavior estimation device 100 estimates the behavior of the person detected in step S12 based on the respective features aggregated in step S14 (step S15).

As described above, according to the present example embodiment, the feature quantity used for estimating the behavior of the person included in the video can be calculated using the feature of the person included in the video, the feature of the object included in the video, and the feature of the periphery of the person included in the video. Further, as described above, according to the present example embodiment, the calculation result of the feature quantity used for estimating the behavior of the person included in the video can be made different according to the relevance degree of the object to the behavior of the person. Therefore, according to the present example embodiment, it is possible to improve the estimation accuracy in estimating the behavior of the person. Further, according to the present example embodiment, it is possible to prevent the deterioration of the estimation accuracy at the time of estimating the behavior of the person, for example, when an object having a high relevance degree to the behavior of the person does not exist in the image, or when the object having a high relevance degree to the behavior of the person cannot be detected.

MODIFICATION

Hereinafter, modifications to the above example embodiment will be described. For the sake of simplicity, a specific description of the part to which the above-described processing can be applied shall be omitted as necessary.

Modification 1

According to the present example embodiment, the behavior estimation processing unit 18 may include a first estimation model, a second estimation model, and a third estimation model, instead of the estimation model 18A. The first estimation model and the second estimation model may be a NN having the different weights from the estimation model 18A, and are learned to estimate the behavior of a person included in a plurality of images in a time series. In addition, the third estimation model may be a NN having the same weights as the estimation model 18A, and is learned to be able to estimate the behavior of a person included in a plurality of images in a time series.

In the case as described above, the behavior estimation processing unit 18 may obtain the first estimation result by inputting the first feature vector including the scene feature quantity to the first estimation model, obtain the second estimation result by inputting the second feature vector including the situation feature quantity to the second estimation model, and obtain the third estimation result by inputting the third feature vector including the integrated feature quantity to the third estimation model. In the above-described case, the behavior estimation processing unit 18 may estimate the behavior of the person included in the video outputted from the video acquisition unit 11 based on the first estimation result, the second estimation result, and the third estimation result. Specifically, when the multiple estimation results, i.e., the first estimation result, the second estimation result, and the third estimation result match, the behavior estimation processing unit 18 may use the behavior corresponding to the multiple estimation results as the final estimation result. In the case as described above, for example, the loss calculated based on the scene feature quantity may be applied to the loss function in the first estimation model, the loss calculated based on the situation feature quantity may be applied to the loss function in the second estimation model, and the loss calculated based on the integrated feature quantity may be applied to the loss function in the third estimation model. As the above-described loss, a cross entropy loss or the like may be used, for example.

Modification 2

Figure 8:
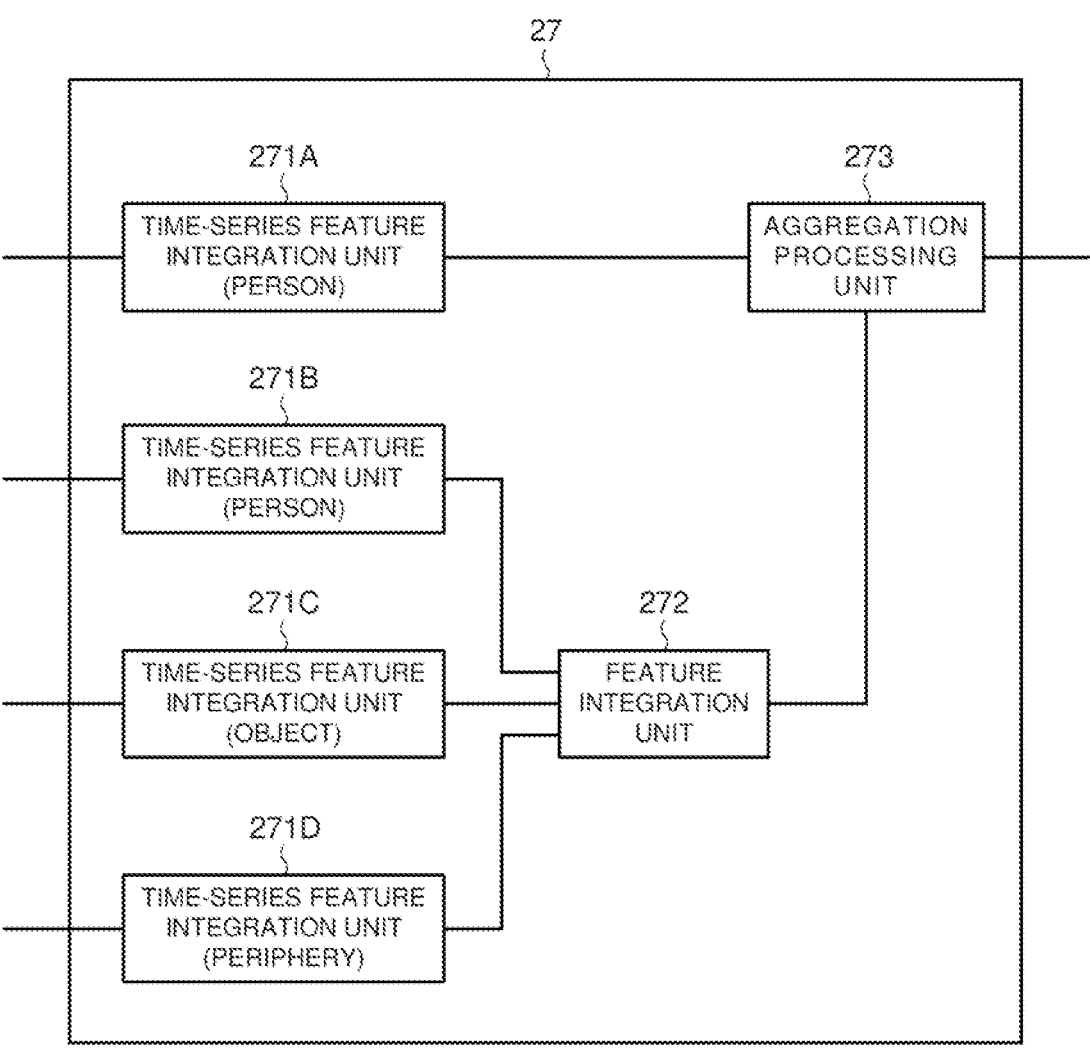
FIG. 8 is a diagram illustrating an example of a configuration of the feature aggregation unit included in the behavior estimation device according to a modification of the first example embodiment.

FIG. 8 is a diagram illustrating an example of a configuration of the feature aggregation unit included in the behavior estimation device according to a modification 2 of the first example embodiment. According to the present example embodiment, instead of the feature aggregation unit 17, the feature aggregation unit 27 as illustrated in FIG. 8 may be provided in the behavior estimation device 100.

The feature aggregation unit 27 includes a time-series feature integration units 271A, 271B, 271C and 271D, a feature integration unit 272, and an aggregation processing unit 273.

The time-series feature integration unit 271A has a function capable of executing the same processing as the time-series feature integration unit 171A, and outputs the person feature quantity obtained by integrating a plurality of person feature quantities included in the person feature quantity column to the aggregation processing unit 273.

The time-series feature integration unit 271B has a function capable of executing the same process as the time-series feature integration unit 171A, and outputs the person feature quantity obtained by integrating a plurality of person feature quantities included in the person feature quantity column to the feature integration unit 272.

The time-series feature integration unit 271C has a function capable of executing the same process as the time-series feature integration unit 171B, and outputs the object feature quantity obtained by integrating a plurality of object feature quantities included in the object feature quantity column to the feature integration unit 272.

The time-series feature integration unit 271D has a function capable of executing the same process as the time-series feature integration unit 171C, and outputs the peripheral feature quantity obtained by integrating a plurality of peripheral feature quantities included in the peripheral feature quantity column to the feature integration unit 272.

The feature integration unit 272 acquires the integrated feature quantities by executing the same processing as the feature integration units 172A, 172B and 172C on the basis of the person feature quantities obtained by the time-series feature integration unit 271B, the object feature quantities obtained by the time-series feature integration unit 271C, and the peripheral feature quantities obtained by the time-series feature integration unit 271D, and outputs the acquired integrated feature quantities to the aggregation processing unit 273. In other words, the feature integration unit 272 is configured to be able to execute a process other than the process related to the acquisition of the feature vector according to the integrated feature quantity among the processes executed by the aggregation processing unit 172. The feature integration unit 272 is configured to be able to acquire the same relevance degree information as the aggregation processing unit 172 and execute processing using the relevance degree information.

The aggregation processing unit 273 acquires a feature vector based on the person feature quantity outputted from the time-series feature integration unit 271A and the integrated feature quantity outputted from the feature integration unit 272, and outputs the acquired feature vector to the behavior estimation processing unit 18. As a process for obtaining a feature vector, the aggregation processing unit 273 may execute a process of connecting the person feature quantity and the integrated feature quantity in the dimensional direction of the feature quantity, or may execute a process of calculating the sum of the person feature quantity and the integrated feature quantity, for example.

This modification is not only applicable to the configuration in which one feature integration unit 272 is connected between the three time-series feature integration units 271B to 271D and the aggregation processing unit 273, but also applicable to the configuration in which, for example, y (y≥2) feature integration units 272 can be connected in series, as shown in FIG. 9. FIG. 9 is a diagram illustrating an example of a configuration in which plural feature integration units are provided in the feature aggregation unit of FIG. 8.

According to the configuration illustrated in FIG. 9, the person feature quantity obtained by the time-series feature integration unit 271B, the object feature quantity obtained by the time-series feature integration unit 271C, and the peripheral feature quantity obtained by the time-series feature integration unit 271D are inputted to the first feature integration unit 272 among the y feature integration units 272. Further, according to the configuration illustrated in FIG. 9, the integrated feature quantity obtained by the (z−1)-th feature integration unit 272, the object feature quantity obtained by the time-series feature integration unit 271C, and the peripheral feature quantity obtained by the time-series feature integration unit 271D are inputted to the z-th (2≤z≤y) feature integration section 272 among the y feature integration units 272. Further, according to the configuration illustrated in FIG. 9, the integrated feature quantities obtained by the y-th feature integration unit 272 are outputted to the aggregation processing unit 273.

Modification 3

Figure 10:
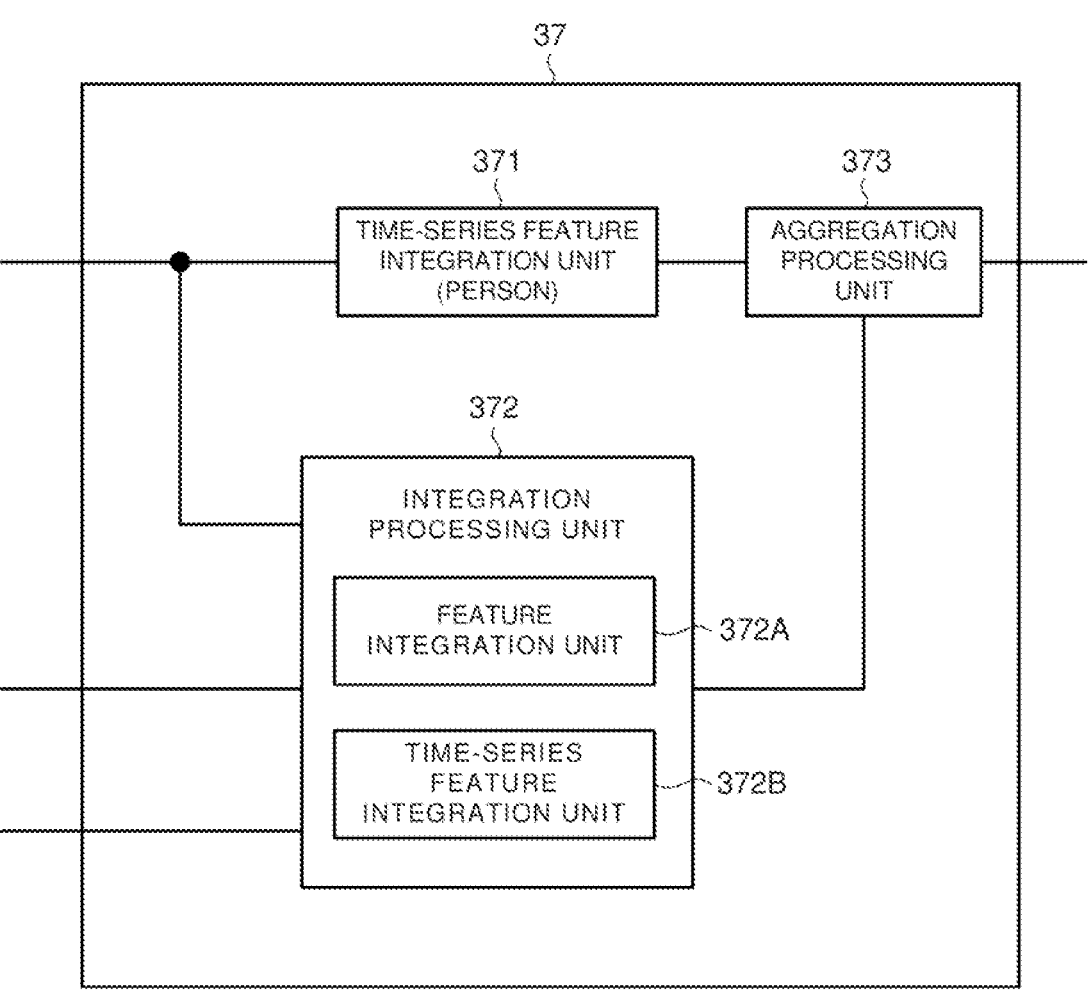
FIG. 10 is a diagram illustrating an example of a configuration of the feature aggregation unit included in the behavior estimation device according to a modification of the first example embodiment.

FIG. 10 is a diagram illustrating an example of a configuration of the feature aggregation unit included in the behavior estimation device according to the modification 3 of the first example embodiment. According to the present example embodiment, instead of the feature aggregation unit 17, the feature aggregation unit 37 as illustrated in FIG. 10 may be provided in the behavior estimation device 100.

The feature aggregation unit 37 includes a time-series feature integration unit 371, an integration processing unit 372, and an aggregation processing unit 373.

The time-series feature integration unit 371 has a function capable of executing the same processing as the time-series feature integration unit 171A, and outputs the person feature quantity obtained by integrating the plurality of person feature quantities included in the person feature quantity column to the aggregation processing unit 373.

The integration processing unit 372 acquires the integrated feature quantity based on the person feature quantity column, the object feature quantity column, and the peripheral feature quantity column, and outputs the acquired integrated feature quantity to the aggregation processing unit 373. The integration processing unit 372 further includes a feature integration unit 372A and a time-series feature integration unit 372B.

The feature integration unit 372A acquires the integrated feature quantity by executing the same processing as the feature integration unit 172A, 172B and 172C based on the person feature quantity column, the object feature quantity column, and the peripheral feature quantity column, and outputs the acquired integrated feature quantity to the time-series feature integration unit 372B. That is, the feature integration unit 372A is configured to be able to acquire the same relevance degree information as the aggregation processing unit 172 and execute processing using the relevance degree information.

The time-series feature integration unit 372B executes a process for integrating a plurality of integrated feature quantities acquired in a time series from the feature integration unit 372A into one. Specifically, time-series feature integration unit 372B integrates the plurality of integrated feature quantities into one person feature quantity by executing weighted addition using a plurality of integrated feature quantities and a NN having a Source-Target Attention mechanism, for example. The time-series feature integration unit 372B outputs the integrated feature quantity integrated for each person identifiable based on the person feature information or the person feature quantity column to the aggregation processing unit 373. The time-series feature integration unit 372B may feedback the integrated feature quantity so as to be incorporated in the process of the feature integration unit 372A. Specifically, the time series feature integration unit 372B may feedback the integrated feature quantity to be included in the person feature quantity column, may feedback the integrated feature quantity to be used instead of the scene feature quantity, and may feedback the integrated feature quantity to be used instead of the situation feature quantity. Further, the process of the time-series feature integration unit 372B may be executed using a NN having a LSTM (Long Short Term Memory), for example.

The aggregation processing unit 373 acquires the feature vector based on the person feature quantity outputted from the time-series feature integration unit 371 and the integrated feature quantity outputted from the integration processing unit 372, and outputs the acquired feature vector to the behavior estimation processing unit 18. As a process for obtaining a feature vector, the aggregation processing unit 373 may execute a process of connecting the person feature quantity and the integrated feature quantity in the dimensional direction of the feature quantity, or may execute a process of calculating the sum of the person feature quantity and the integrated feature quantity, for example.

Second Example Embodiment

Figure 11:
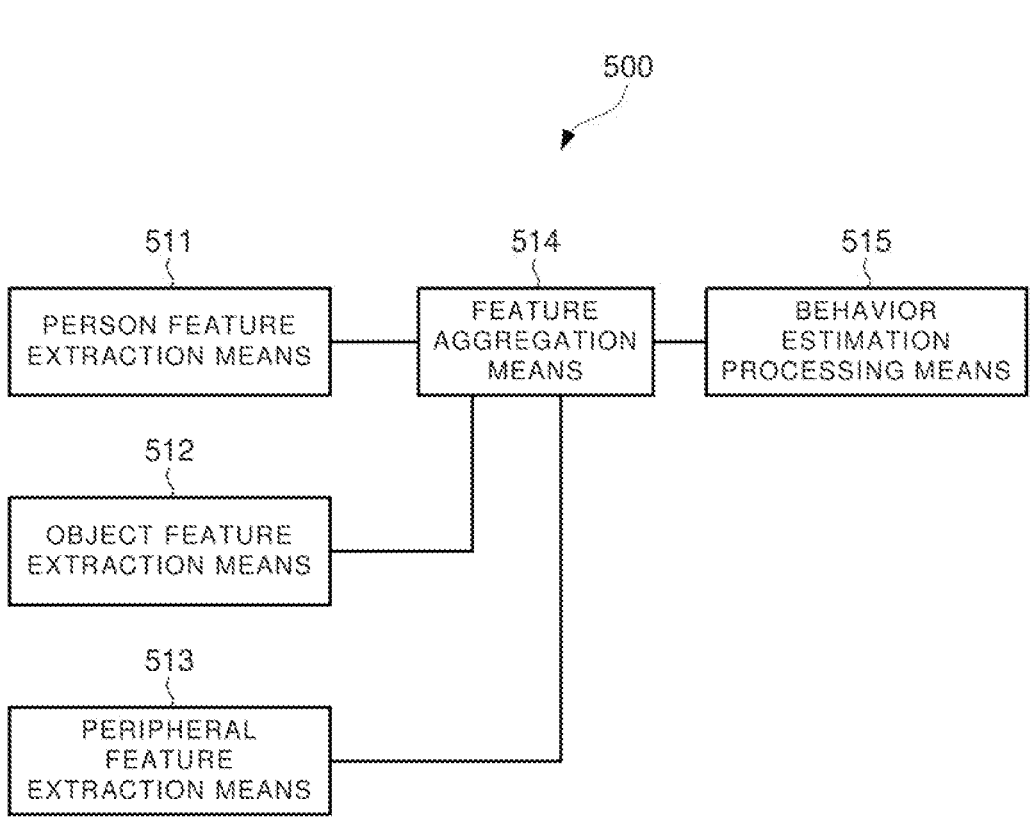
FIG. 11 is a block diagram illustrating a functional configuration of the behavior estimation device according to a second example embodiment.

FIG. 11 is a block diagram illustrating a functional configuration of the behavior estimation device according to the second example embodiment.

The behavior estimation device 500 according to this example embodiment has the same hardware configuration as the behavior estimation device 100. The behavior estimation device 500 includes a person feature extraction means 511, an object feature extraction means 512, a peripheral feature extraction means 513, a feature aggregation means 514, and a behavior estimation processing means 515.

Figure 12:
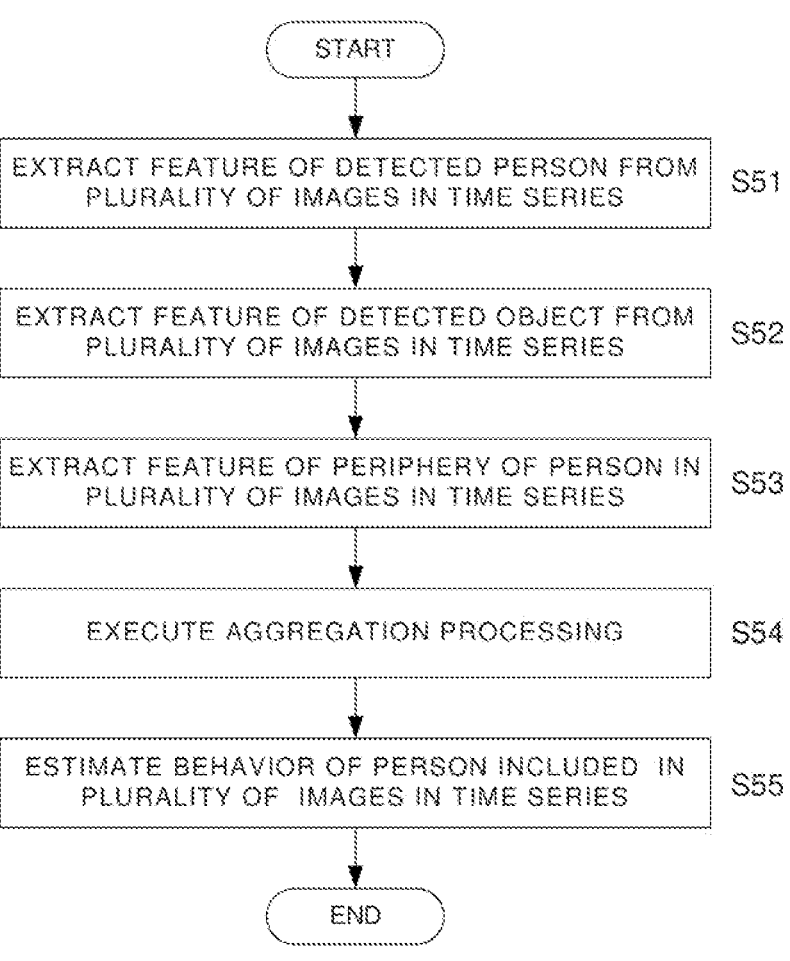
FIG. 12 is a flowchart for explaining a processing executed by the behavior estimation device according to the second example embodiment.

FIG. 12 is a flowchart for explaining processing executed by the behavior estimation device according to the second example embodiment.

The person feature extraction means 511 extracts a feature of a person detected from a plurality of images in a time series (step S51).

The object feature extraction means 512 extract a feature of an object detected from the plurality of images in time series (step S52).

The peripheral feature extraction means 513 extracts a feature of the periphery of the person in the plurality of images in the time series (step S53).

The feature aggregation means 514 executes an aggregation processing for aggregating the feature of the person, the feature of the object, and the feature of the periphery of the person (step S54).

The behavior estimation processing means 515 executes processing for estimating the behavior of the person included in the plurality of images in a time series based on the information including the processing result of the aggregation processing (step S55).

According to this example embodiment, it is possible to improve the estimation accuracy in estimating the behavior of the person.

A part or all of the example embodiments described above may also be described as the following supplementary notes, but not limited thereto.

Supplementary Note 1

A behavior estimation device comprising:

a person feature extraction means configured to extract a feature of a person detected from a plurality of images in a time series;

an object feature extraction means configured to extract a feature of an object detected from the plurality of images;

a peripheral feature extraction means configured to extract a feature of a periphery of the person in the plurality of images;

a feature aggregation means configured to execute aggregation processing for aggregating the feature of the person, the feature of the object, and the feature of the periphery of the person; and a behavior estimation processing means configured to execute estimation processing for estimating the person's behavior included in the plurality of images based on information including a processing result of the aggregation processing.

Supplementary Note 2

The behavior estimation device according to Supplementary note 1, wherein, as the aggregation processing, the feature aggregation means acquires a first processing result by executing a first processing for integrating the feature of the periphery of the person with the feature of the person, acquires a second processing result by executing a second processing for integrating the feature of the object with the first processing result, and acquires a third processing result by executing a third processing for integrating the feature of the periphery of the person with the second processing result.

Supplementary Note 3

The behavior estimation device according to Supplementary note 2, wherein the feature aggregation means acquires relevance degree information that is information indicating a relevance degree of the object to the person's behavior based on a predetermined parameter used in the second processing, and executes the third processing using the acquired relevance degree information.

Supplementary Note 4

The behavior estimation device according to Supplementary note 2, wherein the behavior estimation processing means estimates the behavior of the person included in the plurality of images based on a first estimation result obtained by estimating the behavior of the person from information including the first processing result, a second estimation result obtained by estimating the behavior of the person from information including the second processing result, and a third estimation result obtained by estimating the behavior of the person from information including the third processing result, instead of information including the processing result of the aggregation processing.

Supplementary Note 5

A behavior estimation device comprising:

a person feature extraction means configured to extract a feature of a person detected from a plurality of images in a time series;

an object feature extraction means configured to extract a feature of an object detected from the plurality of images;

a peripheral feature extraction means configured to extract a feature of a periphery of the person in the plurality of images;

a feature integration means configured to execute an integration processing for integrating the feature of the person, the feature of the object, and the feature of the periphery of the person;

an aggregation processing means configured to execute aggregation processing for aggregating the feature of the person and a processing result of the integration processing; and a behavior estimation processing means configured to estimate the person's behavior included in the plurality of images based on information including a processing result of the aggregation processing.

Supplementary Note 6

A behavior estimation method comprising:

extracting a feature of a person detected from a plurality of images in a time series;

extracting a feature of an object detected from the plurality of images;

extracting a feature of a periphery of the person in the plurality of images;

executing aggregation processing for aggregating the feature of the person, the feature of the object, and the feature of the periphery of the person; and executing estimation processing for estimating the person's behavior included in the plurality of images based on information including a processing result of the aggregation processing.

Supplementary Note 7

A behavior estimation method comprising:

extracting a feature of a person detected from a plurality of images in a time series;

extracting a feature of an object detected from the plurality of images;

extracting a feature of a periphery of the person in the plurality of images;

executing an integration processing for integrating the feature of the person, the feature of the object, and the feature of a periphery of the person;

executing aggregation processing for aggregating the feature of the person and a processing result of the integration processing; and estimating the person's behavior included in the plurality of images based on information including a processing result of the aggregation processing.

Supplementary Note 8

A recording medium recording a program, the program causing a computer to execute:

extracting a feature of a person detected from a plurality of images in a time series;

extracting a feature of an object detected from the plurality of images;

extracting a feature of a periphery of the person in the plurality of images;

executing aggregation processing for aggregating the feature of the person, the feature of the object, and the feature of the periphery of the person; and executing estimation processing for estimating the person's behavior included in the plurality of images based on information including a processing result of the aggregation processing.

Supplementary Note 9

A recording medium recording a program, the program causing a computer to execute:

extracting a feature of a person detected from a plurality of images in a time series;

extracting a feature of an object detected from the plurality of images;

extracting a feature of a periphery of the person in the plurality of images;

executing aggregation processing for aggregating the feature of the person, the feature of the object, and the feature of the periphery of the person; and estimating the person's behavior included in the plurality of images based on information including a processing result of the aggregation processing.

While the present invention has been described with reference to the example embodiments, the present invention is not limited to the above example example embodiments. Various changes that can be understood by those skilled in the art within the scope of the present invention can be made in the configuration and details of the present invention. In other words, it is needless to say that the present invention includes various modifications and alterations that could be made by a person skilled in the art according to the entire disclosure, including the scope of the claims, and the technical philosophy. In addition, each disclosure of the above-mentioned patent documents cited shall be incorporated with reference to this document.

This application is based upon and claims the benefit of priority from Japanese Patent Application 2022-093414, filed on Jun. 9, 2022, the disclosure of which is incorporated herein in its entirety by reference.

DESCRIPTION OF SYMBOLS

13 Person feature extraction unit
15 Object feature extraction unit
16 Peripheral feature extraction unit
17 Feature aggregation unit
18 Behavior estimation processing unit
100 Behavior estimation device

The invention claimed is:

1. A behavior estimation device comprising:

a memory configured to store instructions; and one or more processors configured to execute the instructions to:

extract a first feature quantity corresponding to at least one person area detected from a plurality of images in a time series using a neural network;

extract a second feature quantity corresponding of an object area detected from the plurality of images using a neural network, wherein the object area is different from the person area;

extract a third feature quantity corresponding to a background area in the plurality of images using a neural network, wherein the background area is different from the person area and the object area;

acquire a fourth feature quantity by weighted addition of the first feature quantity and the third feature quantity;

acquire a fifth feature quantity by weighted addition of the second feature quantity and the fourth feature quantity;

acquire a sixth feature quantity by weighted addition of the third feature quantity and the fifth feature quantity;

acquire a first estimation result of the behavior of a person included in the person area by applying the fourth feature quantity to a first estimation model;

acquire a second estimation result of the behavior of the person by applying the fifth feature quantity to a second estimation model;

acquire a third estimation result of the behavior of the person by applying the sixth feature quantity to a third estimation model; and acquire a final estimation result of the behavior of the person based on the first estimation result, the second estimation result, and the third estimation result.

2. The behavior estimation device according to claim 1, wherein the one or more processors acquire the values according to weights used in the weighted addition in acquiring the fifth feature as relevance degree information that is information indicating a relevance degree of an object included in the object area to the behavior of a person included in the person area, and set weights to be used in the weighted addition when acquiring the sixth feature using the acquired relevance degree information.

3. A behavior estimation method comprising:

extracting a first feature quantity corresponding to at least one person area detected from a plurality of images in a time series using a neural network;

extracting a second feature quantity corresponding to an object area detected from the plurality of images using a neural network, wherein the object area is different from the person area;

extracting a third feature quantity corresponding to a background area in the plurality of images using a neural network, wherein the background area is different from the person area and the object area;

acquiring a fourth feature quantity by weighted addition of the first feature quantity and the third feature quantity;

acquiring a fifth feature quantity by weighted addition of the second feature quantity and the fourth feature quantity;

acquiring a sixth feature quantity by weighted addition of the third feature quantity and the fifth feature quantity;

acquiring a first estimation result of the behavior of a person included in the person area by applying the fourth feature quantity to a first estimation model;

acquiring a second estimation result of the behavior of the person by applying the fifth feature quantity to a second estimation model;

acquiring a third estimation result of the behavior of the person by applying the sixth feature quantity to a third estimation model; and acquiring a final estimation result of the behavior of the person based on the first estimation result, the second estimation result, and the third estimation result.

4. A non-transitory recording medium recording a program, the program causing a computer to execute the behavior estimation method according to claim 3.

* * * * *